(12) United States Patent
Patel et al.

(10) Patent No.: US 11,434,544 B2
(45) Date of Patent: Sep. 6, 2022

(54) COMPACT COIL ASSEMBLY FOR A VACUUM ARC REMELTING SYSTEM

(71) Applicant: Titanium Metals Corporation, Henderson, NV (US)

(72) Inventors: Ashish D. Patel, Wyomissing, PA (US); Jeremy L. Sensenig, Henderson, NV (US); Robert James McFarland, Jr., Henderson, NV (US); James Leroy Phillips, Henderson, NV (US)

(73) Assignee: Titanium Metals Corporation, Henderson, NV (US)

( * ) Notice: Subject to any disclaimer, the term of this patent is extended or adjusted under 35 U.S.C. 154(b) by 926 days.

(21) Appl. No.: 16/163,157

(22) Filed: Oct. 17, 2018

(65) Prior Publication Data

US 2019/0112688 A1   Apr. 18, 2019

Related U.S. Application Data

(60) Provisional application No. 62/573,229, filed on Oct. 17, 2017.

(51) Int. Cl.
*C22B 9/20* (2006.01)
*C22B 9/22* (2006.01)
*H05B 7/20* (2006.01)

(52) U.S. Cl.
CPC ............ *C22B 9/20* (2013.01); *C22B 9/221* (2013.01); *H05B 7/20* (2013.01)

(58) Field of Classification Search
CPC .............. C22B 9/20; C22B 9/221; H05B 7/20
See application file for complete search history.

(56) References Cited

U.S. PATENT DOCUMENTS 2,978,525 A † 4/1961 Gruber
3,246,373 A † 4/1966 Lyman
4,495,625 A † 1/1985 Heberlein
(Continued)

FOREIGN PATENT DOCUMENTS

CN   105132705    12/2015
GB      953800   † 4/1964
(Continued)

OTHER PUBLICATIONS

International Search Report for international application PCT/US2018/056302, dated Dec. 7, 2018.

*Primary Examiner* — Scott R Kastler
(74) *Attorney, Agent, or Firm* — Burris Law, PLLC

(57) ABSTRACT

A vacuum arc remelting system for forming an ingot from an electrode is provided that includes a crucible assembly configured to accommodate the electrode and the ingot, an electromagnetic energy source arranged about the crucible assembly, and a lift mechanism operable to move the electromagnetic energy source along a longitudinal axis of the crucible assembly. A magnetic field generated by the electromagnetic energy source is localized to an arc region during remelting, and in one form, the electromagnetic energy source is a coil assembly having a magnetic core and a plurality of coil pairs wrapped around the core, wherein the coil assembly is operable to generate a magnetic field from the coil based on electric current flowing in the plurality of coil pairs.

19 Claims, 3 Drawing Sheets

(56) References Cited

U.S. PATENT DOCUMENTS

| | | | |
|---|---|---|---|
| 4,581,745 | A | 4/1986 | Mathews et al. |
| 4,762,165 | A | 8/1988 | Ogino et al. |
| 5,127,468 | A | 7/1992 | Poulsen |
| 6,549,557 | B1 | 4/2003 | Bowman |
| 2019/0112688 | A1* | 4/2019 | Patel ..................... F27D 11/08 |

FOREIGN PATENT DOCUMENTS

| | | |
|---|---|---|
| JP | S61143528 | 7/1986 |
| RU | 2561081 | 8/2015 |
| RU | 2634562 | 10/2017 |

\* cited by examiner
† cited by third party

COMPACT COIL ASSEMBLY FOR A VACUUM ARC REMELTING SYSTEM

CROSS-REFERENCE TO RELATED APPLICATIONS

This application claims priority to and the benefit of U.S. provisional application No. 62/573,229 filed on Oct. 17, 2017. The disclosure of the above application is incorporated herein by reference.

FIELD

The present disclosure relates to a vacuum arc remelting system.

BACKGROUND

The statements in this section merely provide background information related to the present disclosure and may not constitute prior art.

A vacuum arc remelting (VAR) process is generally used in the processing of high performance titanium, zirconium, nickel based alloys and steel, among other alloys. Generally, a VAR system gradually melts an electrode by an electric current that flows through the electrode and arcs to molten metal contained within a crucible. The applied melting current is varied during the process, to achieve the desired molten metal pool geometry. At times, the electric arc can cause beads of metal to spatter onto portions of the crucible wall that are above the molten metal. These portions are cold and can solidify the beads into a porous nonhomogeneous mass, which can cause surface irregularities in the ingot. Issues related to VAR ingot surface quality and internal quality, and other issues are addressed by the present disclosure.

SUMMARY

This section provides a general summary of the disclosure, and is not a comprehensive disclosure of its full scope or all of its features.

In one form of the present disclosure, a vacuum arc remelting system for forming an ingot from an electrode is provided. The system comprises a crucible assembly configured to accommodate the electrode and the ingot, an electromagnetic energy source arranged about the crucible assembly, and a lift mechanism operable to move the electromagnetic energy source along a longitudinal axis of the crucible assembly. In this system, a magnetic field generated by the electromagnetic energy source is localized to an arc region during remelting. In some aspects of the present disclosure, the electromagnetic energy source is a coil assembly comprising a magnetic core and a plurality of coil pairs wrapped around the core. The coil assembly is operable to generate a magnetic field from the coil based on electric current flowing in the plurality of coil pairs. In some aspects of the present disclosure, the core is made of a permeability ferromagnetic material. Also, in one aspect the present disclosure, the coil assembly includes three coil pairs. In such an aspect, the electric current in each of the three coil pairs may be 120° out of phase.

In some aspects of the present disclosure, the system further comprises a control system configured to enable bi-directional current flow in each coil of the plurality of coil pairs. In one variation, the control system cycles the electric current through the coils in a sinusoidal manner with a predetermined phase angle offset to generate a magnetic field from the coil. In one aspect of the present disclosure, the control system includes at least one H-bridge board for each coil pair.

In another form of the present disclosure, a vacuum arc remelting system for forming an ingot from an electrode is provided. The system comprises a crucible assembly configured to accommodate the electrode and the ingot, a coil assembly, and a lift mechanism. The coil assembly is arranged about the crucible assembly and includes a magnetic core and a plurality of coil pairs wrapped around the magnetic core. The coil assembly is operable to generate a magnetic field from the coil formed by (i.e., rotated by) electric current received by each coil of the plurality of coil pairs. The lift mechanism is operatively engaged with the coil assembly and is operable to move the coil assembly along a longitudinal axis of the crucible assembly such that the magnetic field from the coil is localized to an arc region during remelting. In some aspects of the present disclosure, the lift mechanism includes a platform upon which the coil assembly is positioned. In such aspects, at least one motor that is operable to move the platform and the coil assembly along the longitudinal axis of the crucible assembly is included. In one aspect of the present disclosure, the system further includes a control system configured to drive the at least one motor of the lift mechanism and move the coil assembly based on a height of the ingot during remelting.

In yet another form of the present disclosure, a vacuum arc remelting system for forming an ingot from an electrode is provided. The system comprises a crucible assembly configured to accommodate the electrode, the ingot, and an electromagnetic energy source. The electromagnetic energy source is arranged about the crucible assembly, wherein the electromagnetic energy source and the crucible assembly are configured to move relative to one another along a longitudinal axis of the crucible assembly. Further, a magnetic field generated by the electromagnetic energy source is localized to an arc region during remelting.

In still another form of the present disclosure, a method of vacuum arc remelting an ingot is provided. The method comprises generating a rotating magnetic field normal to a longitudinal axis of the ingot and localized to an arc region during remelting. The rotating magnetic field interacts with a melting current to produce a rotating arc directed radially outward. In some aspects of the present disclosure, the method includes moving an electromagnetic energy source along the longitudinal axis of the ingot as the ingot is being formed and the electromagnetic energy source generates the rotating magnetic field. The rotating magnetic field may be formed by cycling electric current through a coil assembly in a sinusoidal manner with a predetermined phase angle offset to generate the rotating magnetic field. Also, the coil assembly includes a magnetic core and a plurality of coil pairs wrapped around the core. In some aspects of the present disclosure, the method includes moving the rotating magnetic field along an axis parallel to the longitudinal axis of the ingot as the ingot is being formed. In other aspects of the present disclosure, the method includes moving a crucible assembly that contains the ingot relative to the rotating magnetic field as the ingot is being formed. In still other aspects, the method includes a combination of moving the rotating magnetic field along an axis parallel to the longitudinal axis of the ingot as the ingot is being formed and moving a crucible assembly that contains the ingot relative to the rotating magnetic field as the ingot is being formed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
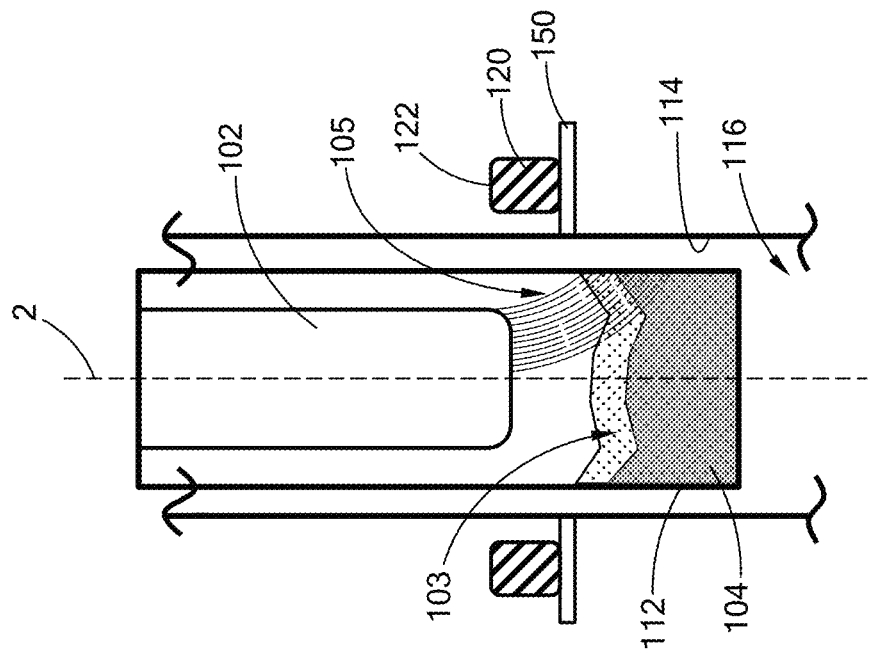
FIG. 2 is a partial cross-sectional view of the VAR system of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To address the surface irregularities of the formed ingot, a VAR system may include large stationary coils in a Helmholtz configuration that are arranged around a crucible. The stationary coils extend along the entire length of the crucible and are used to generate a transverse magnetic field. Such VAR system is described in detail in U.S. Pat. No. 4,581,745 which is commonly assigned with the present application and the disclosure of which is incorporated herein by reference.

While the VAR system having the Helmholtz configured coils may reduce surface irregularities, the coils have to be placed a significant distance away from the crucible. In addition, due to their large size, the coils require more power to generate the required magnetic field.

Generally, a VAR system of the present disclosure includes an electromagnetic energy source and a lift mechanism for moving the electromagnetic energy source with the growing molten metal (i.e., ingot), such that the magnetic field is localized. In one form, the electromagnetic energy source is a compact coil assembly, and as described further herein, in one form, the coil assembly includes a ring shaped magnetic core, made up of a high permeability material and wound with insulated wires. The coil assembly is operable to generate a rotating magnetic field that is perpendicular to the normal axis of the coil assembly. This rotating magnetic field generated interacts with the melting current to move the arc radially in a direction perpendicular to the normal axis of the electrode and ingot.

Although the lift mechanism is illustrated and described as moving the electromagnetic energy source relative to the ingot, it should also be understood that the ingot may be moved relative to the electromagnetic energy source, or both the electromagnetic energy source and the ingot may move while remaining within the scope of the present disclosure.

One form of the VAR system of the present disclosure will now be described with reference to the accompanying drawings.

Figure 1:
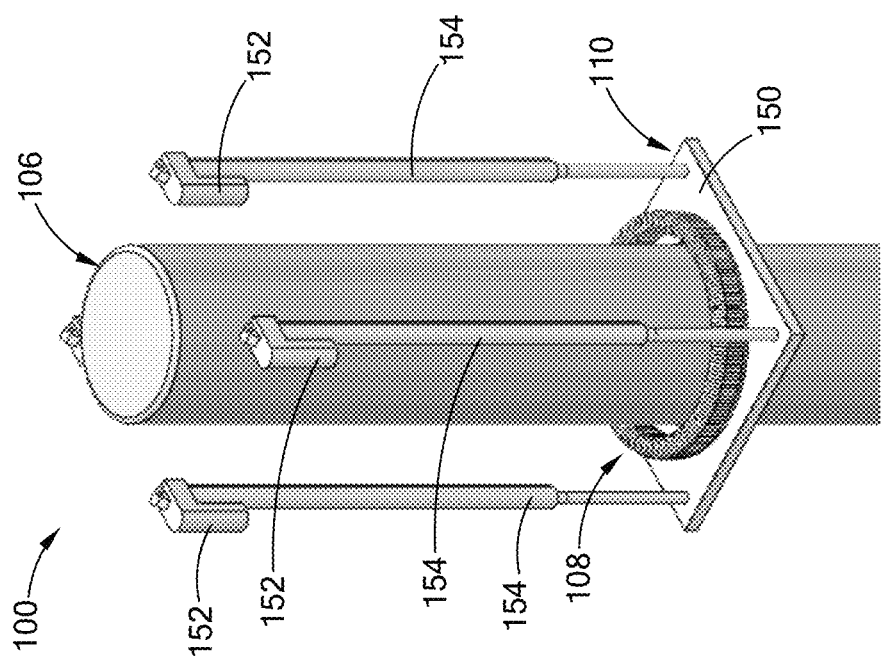
FIG. 1 is a perspective view illustrating a VAR system having a coil assembly and a lift mechanism in accordance with the teachings of the present disclosure.

Referring to FIGS. 1 and 2, a VAR system 100, which may also be referred to as a VAR furnace, is used to gradually melt an electrode 102 to form an ingot 104, which has a pool of molten metal 103. In one form, the VAR system includes a crucible assembly 106, a coil assembly 108 (i.e., electromagnetic energy source) arranged about the crucible assembly 106, and a lift mechanism 110 for moving the coil assembly 108 along an exterior of the crucible assembly 106.

The crucible assembly 106 accommodates the electrode 102 and holds the ingot 104 formed from the electrode 102. In one form, the crucible assembly 106 includes a crucible 112 ("crucible" hereinafter) and a cooling member 114 that defines a chamber 116 around the crucible 112 for receiving a coolant, such as water, to reduce the temperature of the crucible 112. Other suitable systems for cooling the crucible may also be used and are within the scope of the present disclosure. The crucible 112 and the cooling member 114 may be made of nonmagnetic material such as cooper and stainless steel.

During the remelting process, electrical arcs that function to melt the electrode 102 extend between the electrode 102 and an inner wall of the crucible 112, generally defining an arc region 105 as shown. Advantageously, as described in greater detail below, the magnetic fields generated by an electromagnetic energy source are localized to this arc region 105 (or in other words, limited to this arc region 105 rather than along the entire crucible 112, or a substantial portion thereof) during remelting, thereby resulting in improved surface quality of the ingot 104 and reducing the amount of electrode remnant at the end of the remelting process.

The coil assembly 108 is positioned adjacent to the crucible 112 assembly and moves along a longitudinal axis 2 of the crucible 112, the crucible assembly 106, and the ingot 104 as the ingot 104 grows. The coil assembly includes a core 120 with plurality of coils 122 wrapped around the core 120. As described further below, the core 120 and the coils 122 are operable to form a transverse magnetic field that is substantially confined to a gap between the electrode 102 and the ingot 104. In one form, the core 120 is a ring-shaped toroid with a rectangular cross-section and is constructed by stacking layers of a high permeability ferromagnetic material, such as annealed electrical steel. The core can be configured in other suitable shapes and material and should not be limited to the examples provided herein.

Figure 3:
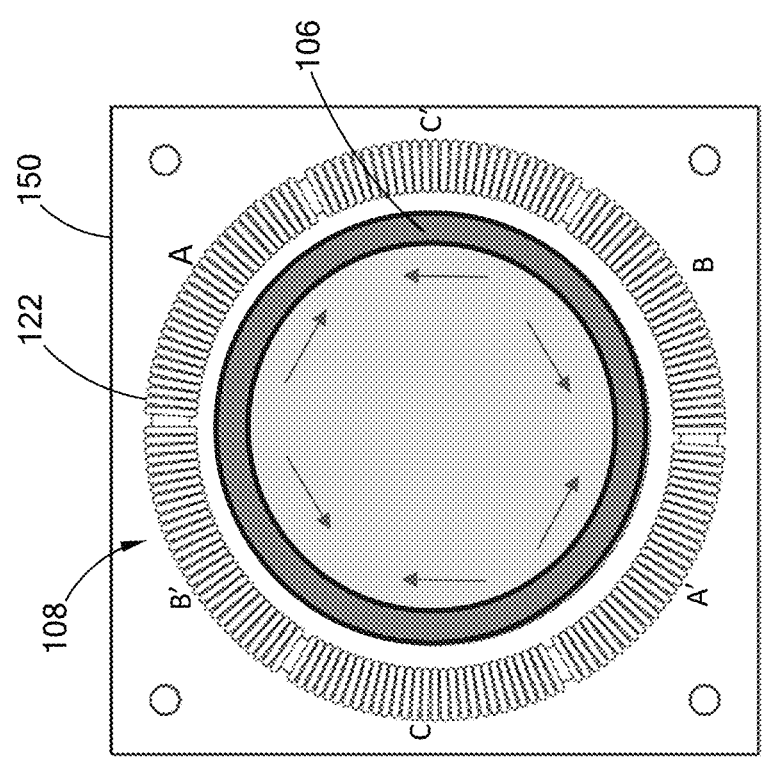
FIG. 3 is a partial top view of the VAR system of FIG. 1.

The coils 122 may be an insulated solid copper wire or a hollow copper tube that is wound around the core 120. The windings are split to form one or more coil pairs, where coils of a coil pair are arranged on opposite sides of the core 120. For example, referring to FIG. 3, the coil assembly 108 includes three coil pairs (e.g., coil pair A-A'; coil pair B-B'; and coil pair C-C'), where the coils of each pair are arranged on opposite sides of the core. Each coil pair is configured to receive a sinusoidal current, with the current in each pair being 120° out of phase. The direction of the magnetic field from each pair is represented by the arrows in FIG. 3.

Figure 4:
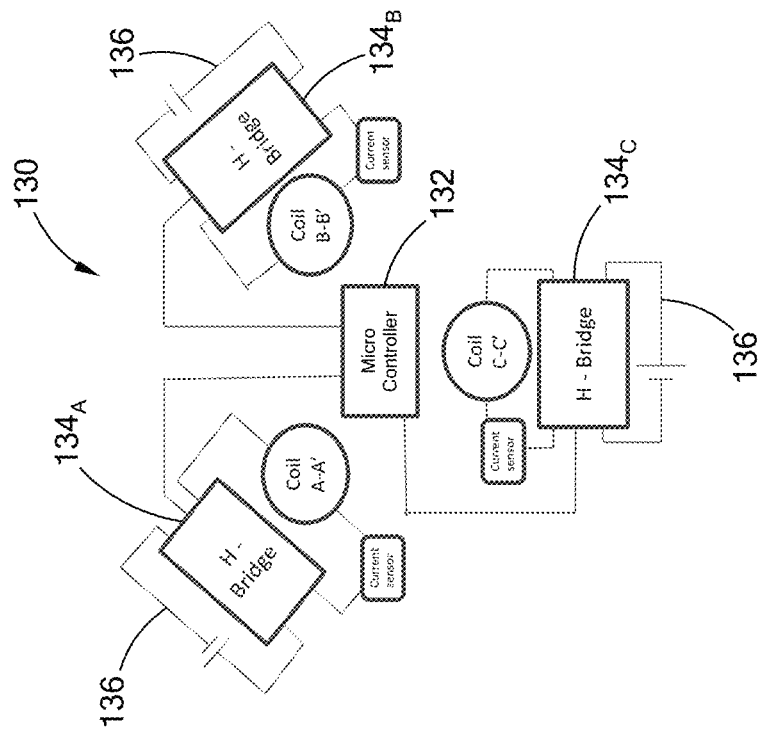
FIG. 4 is a schematic diagram illustrating a coil controller in accordance with the teachings of the present disclosure.

To control the current through the coil assembly 108 and thus, control the magnetic field, the VAR system 100 further comprises a coil current controller. Referring to FIG. 4, a coil current controller 130 includes a microcontroller 132, at least one H-bridge for each coil pair (e.g., H-bridges 134A, 134B, and 134C for coil pairs A-A'; B-B'; and C-C', respectively), and one or more DC power supplies 136. The H-bridges 134A, 134B, and 134C may collectively be referred to as H-bridges 134. The H-bridges 134 enable bi-directional current flow in the respective coil pairs.

The microcontroller 132 is programmed to control the magnetic field by controlling the current through the coil pairs. More particularly, the maximum current, which also limits the maximum magnetic field that can be generated, is determined based on a ratio of a power supply voltage from the DC power supply 136 and a resistance of the coils 122. The current in each coil pair at any instant is given by Equations 1-3 below, where $V_o$ is the power supply voltage, R is the resistance of each coil pair, ω is the angular frequency (i.e., ω=2πf), and t is time.

$$I_{A-A'} = \frac{V_o}{R}\sin(\omega t) \quad \text{Equation 1}$$

$$I_{B-B'} = \frac{V_o}{R}\sin(\omega t + 2\pi/3) \quad \text{Equation 2}$$

$$I_{C-C'} = \frac{V_o}{R}\sin(\omega t + 4\pi/3) \quad \text{Equation 3}$$

As the sinusoidal current cycles through the coil pairs, the dwell time is given by $$t_d = \frac{\theta}{f*360},$$

where θ is the increment angle in degrees and f is the rotational frequency of the arc and is defined as $$f = \frac{RPM}{60}.$$

Each coil pair generates a magnetic field that is proportional to the instantaneous current, and the resultant magnetic field obtained from the vector sum of the three individual fields (i.e., the magnetic flux density (B)) is given by Equation 4, where $B_o$ is the field at the center of the core at maximum current, and $\hat{a}_x$, $\hat{a}_y$ are unit vectors. As demonstrated in Equation 4, the magnitude of the resultant field at the center at any instant is constant and is augmented by 1.5 times the field from the individual coil pair.

$$B = \frac{3}{2}B_o\left[\sin\left(wt + \frac{\pi}{6}\right)\hat{a}_x + \cos\left(wt + \frac{\pi}{6}\right)\hat{a}_y\right] \quad \text{Equation 4}$$

The externally imposed magnetic field is largely confined to the gap between the electrode and ingot and causes the arc between the electrode and the ingot to move toward the wall of the crucible 112. By cycling the electric current through the coils in a sinusoidal fashion with proper phase angle offsets, a rotating magnetic field is generated. The direction of rotation of the arc (e.g., clockwise or counter clockwise) is controlled based on the sequence at which the coils are energized, and the rate of the rotation is dependent on the frequency of electrical energization of the coils. In addition, by controlling the current through the coil pairs, a suitable magnetic field can be generated to control the position of the arc. That is, the magnetic field interacts with a melting DC current to generate a force (F) on the arc, which is defined in Equation 5, where J is applied current density, and B is the magnetic flux density.

$$F = J \times B \quad \text{Equation 5}$$

By selecting appropriate process set-points (e.g., coil resistance, power supply, phase angle offset, others), the arc is swept along the circumference of the ingot, which, in turn, helps improve the smoothness of the ingot surface.

In lieu of forming the magnetic field through the full height of the crucible, the coil assembly 108 is moved by the lift mechanism 110 in accordance with the growth of the ingot. With continuous reference to FIGS. 1 and 3, the lift mechanism 110 includes a platform 150 upon with the coil assembly 108 is positioned, and one or more drive motors 152 that are operable to gradually move the platform 150 having the coil assembly 108. In one form, the platform 150 is an insulated plate that is attached to four posts 154, where each post is controlled by a drive motor 152 for moving the platform 150.

Figure 5:
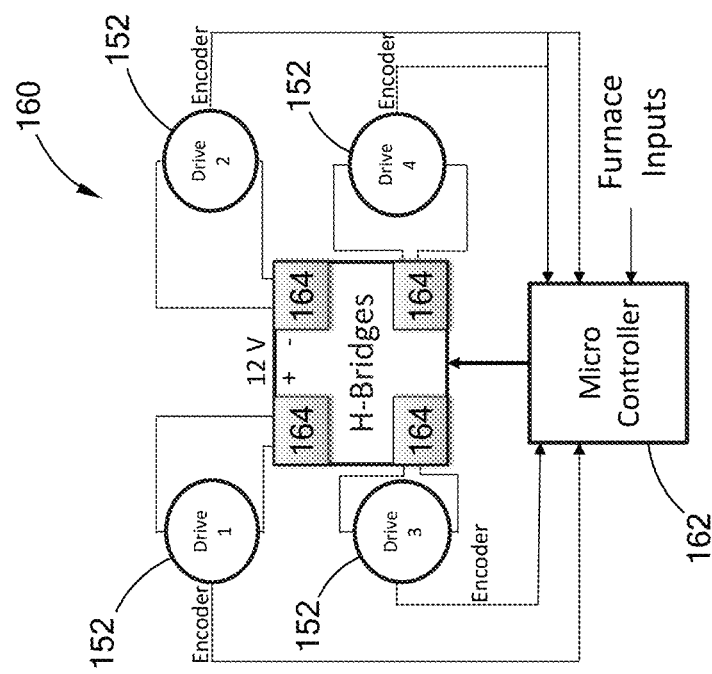
FIG. 5 is a schematic diagram illustrating a lift controller in accordance with the teachings of the present disclosure.

To control the lift mechanism 110, the VAR system 100 further includes a lift drive controller. Referring to FIG. 5, in one form, a lift drive controller 160 includes a microcontroller 162, one H-bridge 164 for each drive motor 152, where the H-bridges 164 are coupled to a DC power supply (e.g., 12V). The microcontroller 162 is programmed to adjust the height of the lift mechanism 110 based on a height of the ingot melt, which can be determined based on characteristics associated with the ingot. For example, in one form, the VAR system 100 is equipped with load cells, and thus the ingot height (h) can be estimated using the relationship set out in Equation 6 in which $\rho_i$ is the density of ingot, $A_i$ is the area of ingot, and $\dot{m}$ is the melt rate. Alternatively, if the VAR system does not include load cells, the ingot height can be estimated from the travel amount of the electrode (i.e., a ram travel) which is provided by Equation 7, in which X is the ram travel, $\rho_e$ is the density of electrode, and $A_e$ is the area of electrode. The variables in Equations 6 and 7 can be inputted to the microcontroller 162 and are represented as furnace inputs in the drawings.

$$h = \frac{1}{\rho_i A_i}\int \dot{m}\, dt \quad \text{Equation 6}$$

$$h = \frac{X}{\left(\frac{A_i \rho_i}{A_e \rho_e} - 1\right)} \quad \text{Equation 7}$$

Based on the foregoing, in operation, the VAR system 100 includes the coil assembly 108 that is compact and moveable by the lift mechanism 110, such that the coil assembly 108 travels as the ingot grows. The coil assembly 108 is operable to generate a localized rotating magnetic field for forming a rotating arc between the electrode and the ingot. Specifically, the magnetic field interacts with the arc plasma to accelerate it radially (i.e., perpendicular the normal axis of the electrode), thereby moving it towards the crucible. This action, in turn has a positive impact on the ingot surface quality since the thermal energy from the arc removes (melts) the splatter on the crucible, and hence as the ingot grows, it solidifies on a bare crucible, and not on a shell of splatter.

The compact design of the coil assembly enables easy retrofitting to existing VAR furnaces and requires minimal clearance around the crucible assembly. In addition, due to the compact size of the coil assembly, the voltage and current necessary to generate the magnetic field are relatively small compared to systems having larger coils that generate the magnetic field throughout the crucible. While the coil assembly is described as having three coil pairs, the scope of the present disclosure is applicable to multiple coil pairs and should not be limited to three.

The VAR system of the present disclosure is configured to position and control the arc towards the surface of the ingot and thus, significantly improve the ingot surface quality. Since, the coil traverses the arc, the external transverse field is applied only to the arc region and not to the molten metal pool. This in turn aids in obtaining the desired molten metal pool shape by confining effects of applied magnetic field to the proximity of the arc. In addition, by altering the arc behavior at the end of the process, the amount of electrode remnant, can be minimized.

In addition to controlling the coil assembly to manage the surface integrity of the ingot and the remnant shape and weight, the VAR system of the present disclosure may also be used during the melting to control the arc location, and thus, impact the overall pool shape, thereby improving the solidification structure. A further use could be during early stages of vacuum arc melting known as start up to reduce the time for startup and to improve the overall integrity of the base. In fact, any approach where the coil arrangement and control approach can be used to manage the arc location over time to yield beneficial effects can be envisioned and is within the scope of the present disclosure.

The coil current controller and the lift controller may be collectively referred to as a control system of the VAR system. While the coil current controller and the lift controller are described as having independent microcontrollers, one microcontroller may be configured to perform the operations of the coil current controller and the lift controller.

The algorithm for the coil current controller may be incorporated into existing PLC based VAR control systems using a text-based programing language. Alternatively, the coil current controller can be a standalone system.

The field strength and rotation (RPM) are software parameters that can be readily varied during different stages of a typical melt. For example, parameters can be customized for each of the following stages of heating: a startup stage, a steady state, and a hot top stage. The field strength, and rotation (RPM) can also be adjusted based on the type of alloy being melted, associated arc gap, and annulus distance.

In an experimental implementation of a VAR system of the present disclosure, a coil assembly was arranged around a 203 mm (eight-inch) VAR furnace with a 25.4 mm (one-inch) gap provided between the coil assembly and the furnace. The coil assembly had an internal diameter of 381 mm (15 inches), an outer diameter of 432 mm (17 inches), and a height of 76 mm (three inches). The coil assembly was formed by stacking 0.254 mm (0.01 inch) thick sheets of industrial grade electrical steel to form the core, and three layers of 1 mm (18 gauge) insulated copper wire was wound around the core.

Figure 6:
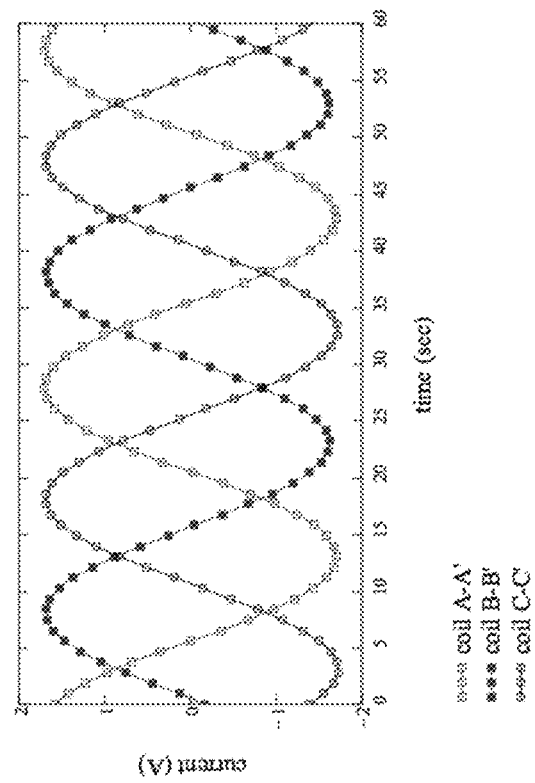
FIG. 6 is a graph of three sinusoidal current waveforms in accordance with the teachings of the present disclosure.

In one experimental finding, an electric current in the range of 0 to 1.6 A, and a voltage in the range of 0 to 10 V was sufficient to generate a maximum magnetic field of 20 G per coil pair at the center of the crucible, and a net field of 30 G. The arc was rotated at 2 to 5 RPM, with increment angles in the range of 1 to 15 degrees with reversals every 5 minutes. A plot of the three sinusoidal current waveforms during the test is show in FIG. 6. Under these test conditions, in order to tract the ingot height, the lift mechanism was moved in the range of 0 to 0.5 min/min. This experimental implementation is provided to further illustrate the operation of the VAR assembly of the present disclosure and is not intended to limit the VAR assembly to parameters described in the experiment.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vacuum arc remelting system for forming an ingot from an electrode, the vacuum arc remelting system comprising:
   a crucible assembly configured to accommodate the electrode and the ingot;
   an electromagnetic energy source arranged around the crucible assembly and operable to generate a rotating magnetic field, wherein the electromagnetic energy source is a coil assembly comprising a magnetic core and a plurality of coil pairs wound around the magnetic core, wherein each coil pair includes two coils oppposedly arranged from one another about the magnetic core, wherein the plurality of coil pairs includes a first coil pair, a second coil pair, and a third coil pair;
   a coil current controller configured to provide electric current to the plurality of coil pairs to control a direction of the rotating magnetic field generated by the electromagnetic energy source, wherein the direction of the rotating magnetic field generated by a first coil of the first coil pair is different from that of a first coil of the second coil pair and that of a first coil of the third coil pair, wherein the first coil of the first coil pair is arranged between the first coil of the second coil pair and the first coil of the third coil pair;
   a lift mechanism operable to move the electromagnetic energy source along a longitudinal axis of the crucible assembly; and
   a lift drive controller configured to adjust a height of the lift mechanism based on a height of an ingot melt, wherein the height of the lift mechanism localizes the electromagnetic energy source at a gap between the electrode and the ingot during remelting.

2. The vacuum arc remelting system of claim 1, wherein the coil assembly includes three coil pairs.

3. The vacuum arc remelting system of claim 2, wherein the electric current in each of the three coil pairs is 120° out of phase.

4. The vacuum arc remelting system of claim 1, wherein the coil current controller is configured to enable bi-directional current flow in each coil of the plurality of coil pairs.

5. The vacuum arc remelting system of claim 4, wherein the coil current controller is configured to cycle the electric current through the plurality of coil pairs in a sinusoidal manner with a predetermined phase angle offset to generate the rotating magnetic field from the coil.

6. The vacuum arc remelting system of claim 4, wherein the coil current controller includes at least one H-bridge board for each coil pair.

7. The vacuum arc remelting system of claim 1, wherein the magnetic core is made of a permeability ferromagnetic material.

8. A vacuum arc remelting system for forming an ingot from an electrode, the vacuum arc remelting system comprising:

a crucible assembly configured to accommodate the electrode and the ingot;

a coil assembly arranged about the crucible assembly, the coil assembly comprising a magnetic core and a plurality of coil pairs wrapped around the magnetic core, wherein the coil assembly is operable to generate a rotating magnetic field traveling in a direction from the coil assembly based on an electric current received by each coil of the plurality of coil pairs, wherein each coil pair includes two coils opposedly arranged from one another about the magnetic core;

a lift mechanism operatively engaged with the coil assembly, the lift mechanism being operable to move the coil assembly along a longitudinal axis of the crucible assembly; and a lift drive controller configured to adjust a height of the lift mechanism based on a height of an ingot melt to provide the coil assembly at a gap between the electrode and the ingot during remelting.

9. The vacuum arc remelting system of claim 8, wherein the lift mechanism includes a platform upon which the coil assembly is positioned and at least one motor that is operable to move the platform and the coil assembly along the longitudinal axis of the crucible assembly.

10. The vacuum arc remelting system of claim 9, wherein the lift drive controller is configured to drive the at least one motor of the lift mechanism and move the coil assembly based on the height of the ingot melt during remelting.

11. The vacuum arc remelting system of claim 8 further comprising a coil current controller configured to enable bi-directional current flow in each coil of the plurality of coil pairs.

12. The vacuum arc remelting system of claim 11, wherein the coil current controller is configured to cycle the electric current through the plurality of coil pairs in a sinusoidal manner with a predetermined phase angle offset to generate the rotating magnetic field from the coil.

13. The vacuum arc remelting system of claim 11, wherein the coil current controller includes at least one H-bridge board for each coil pair.

14. A vacuum arc remelting system for forming an ingot from an electrode, the vacuum arc remelting system comprising:

a crucible assembly configured to accommodate the electrode and the ingot;

an electromagnetic energy source arranged around the crucible assembly and operable to generate a rotating magnetic field, wherein the electromagnetic energy source and the crucible assembly are configured to move relative to one another along a longitudinal axis of the crucible assembly, wherein the electromagnetic energy source is a coil assembly comprising a magnetic core and a plurality of coil pairs wound around the magnetic core, wherein each coil pair includes two coils opposedly arranged from one another about the magnetic core, wherein the plurality of coil pairs includes a first coil pair, a second coil pair, and a third coil pair; and a coil current controller configured to provide electric current to the plurality of coil pairs to control a direction of the rotating magnetic field generated by the electromagnetic energy source, wherein the direction of the rotating magnetic field generated by a first coil of the first coil pair is different from that of a first coil of the second coil pair second coil and that of a first coil of the third coil pair, wherein the first coil of the first coil pair is arranged between the first coil of the second coil pair and the first coil of the third coil pair, wherein the rotating magnetic field is localized to a gap between the electrode and the ingot during remelting.

15. The vacuum arc remelting system of claim 14, wherein the plurality of coil pairs includes three coil pairs.

16. The vacuum arc remelting system of claim 15, wherein the electric current in each of the three coil pairs is 120° out of phase.

17. The vacuum arc remelting system of claim 14, wherein the coil current controller is configured to enable bi-directional current flow in each coil of the plurality of coil pairs.

18. The vacuum arc remelting system of claim 17, wherein the coil current controller is configured to cycle the electric current through the plurality of coil pairs in a sinusoidal manner with a predetermined phase angle offset to generate the rotating magnetic field from a respective coil.

19. The vacuum arc remelting system of claim 14, wherein the coil current controller is configured to provide the electric current flowing in the plurality of coil pairs to control the direction of the rotating magnetic field based on a sequence of energizing each of the plurality of coil pairs such that the arc is swept along a direction of the ingot.

* * * * *